(No Model.)
H. H. HOPKINS.
BICYCLE.
No. 506,194. Patented Oct. 3, 1893.
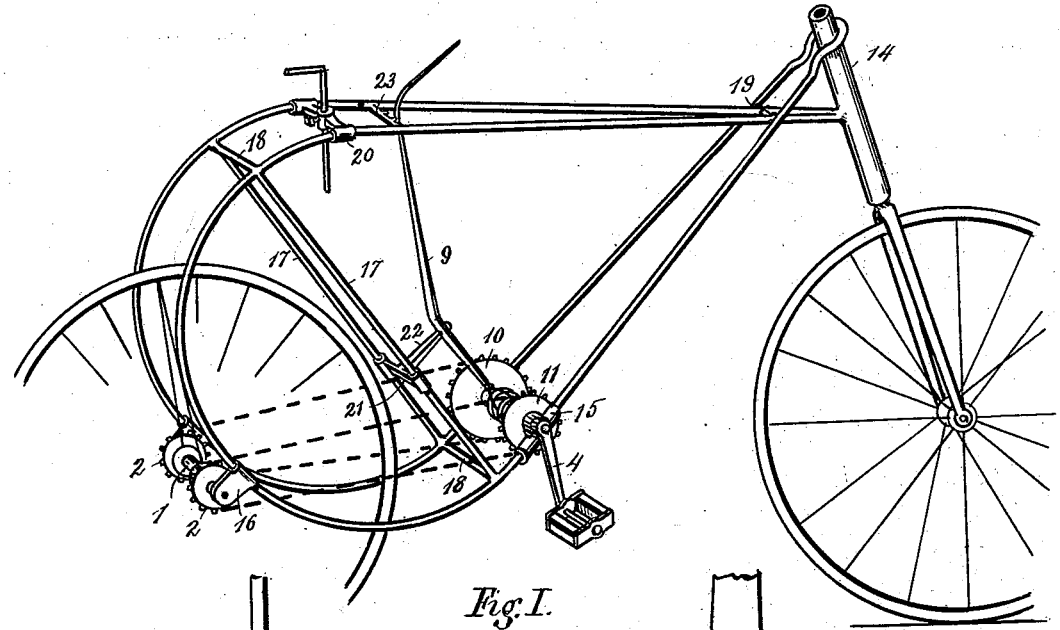
Fig. I.
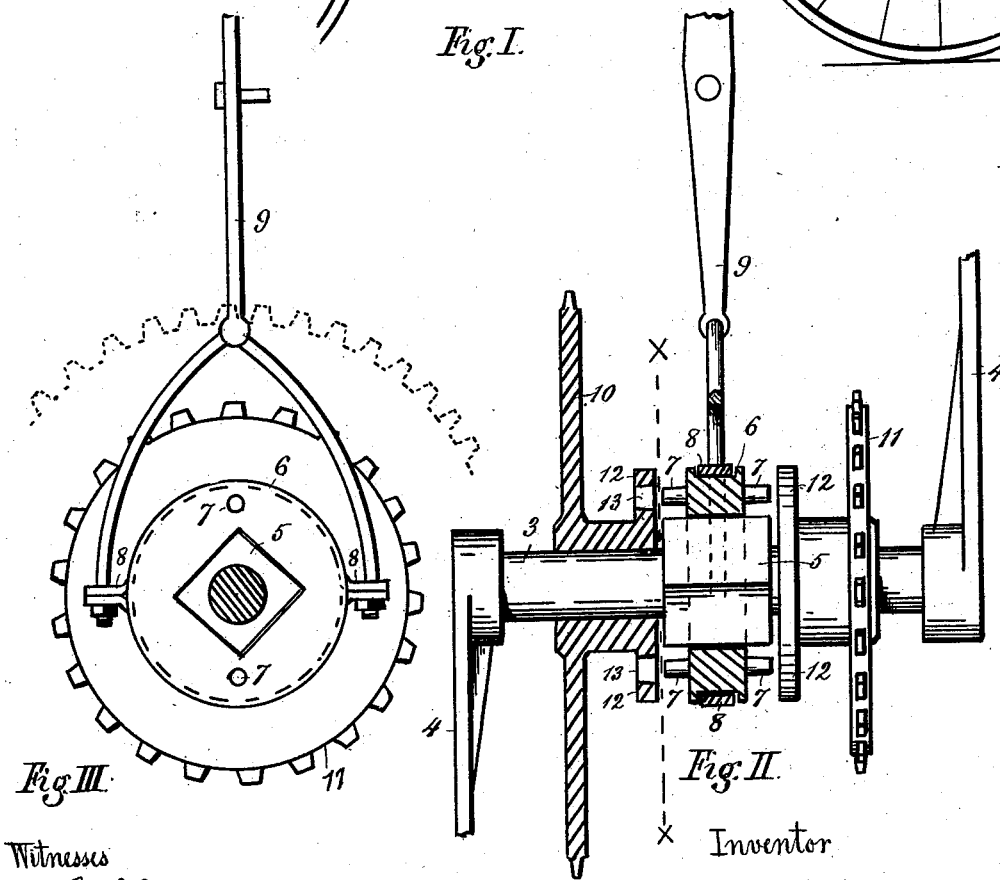
Fig. III.   Fig. II.
Witnesses
R. S. Millar
L. M. Adams
Inventor
H. H. Hopkins
by C. J. Bailey Atty.

UNITED STATES PATENT OFFICE.

HOWARD H. HOPKINS, OF GOSHEN, INDIANA.

BICYCLE.

SPECIFICATION forming part of Letters Patent No. 506,194, dated October 3, 1893.

Application filed December 9, 1892. Serial No. 454,626. (No model.)

*To all whom it may concern:*

Be it known that I, HOWARD H. HOPKINS, a citizen of the United States, residing at Goshen, in the county of Elkhart and State of Indiana, have invented a new and useful Improvement in Bicycles, which improvement is fully set forth in the following specification and accompanying drawings, in which—

Figure 1 is a perspective of a bicycle provided with my improved differential gearing and double frame. Fig. 2 is an enlarged detail view of the gearing, partly in section, and Fig. 3, a transverse section on line $x\ x$ of Fig. 2.

My invention relates to improvements in bicycles and other vehicles propelled by pedal or hand levers and its purpose is to provide simple, convenient and durable adjuncts whereby the speed may be easily and promptly accelerated or retarded according to the condition of the roadway or the pleasure of the rider.

Referring to the accompanying drawings, 1 designates the rear axle provided with sprocket wheels 2 rigidly attached thereto.

3 indicates the driving shaft or axle which is operated in the usual manner by pedals 4. The central longitudinal portion of this shaft has a rectangular enlargement 5 which revolves within and imparts rotary motion to a clutch disk 6 having clutching pins 7, and a peripheral groove which contains a loosely fitting non-rotatable collar or metal strap 8. Being made in two sections as shown, the collar is easily introduced in the groove. A bifurcated shifting lever 9 is attached at the juncture of the sections and controls the lateral movement of the disk on the rectangular portion of the shaft. The high and low speed sprocket wheels 10 and 11 are adapted to turn freely on the shaft except when brought into engagement with the clutching mechanism and are provided interiorly with ball bearings or other suitable anti-friction appliances. The inner ends of the hubs of the sprocket wheels have flanges 12, on the inner sides of which are apertures 13 which are approximately oval or V shaped in cross section. The clutching pins are thus easily admitted and as they advance toward the smaller ends of the apertures become securely clamped between the converging sides thereof.

The peculiar construction and arrangement of the gearing as described involves the necessity of a double frame. This consists of a single piece of small sized metal tubing, the longitudinal center of which is bent around and clamped upon the sleeve of the guide bar 14. The ends are then extended downwardly and diverging to the rear forming supports for the adjustable journal boxes 15 of the driving shaft, and the rear wheel boxes 16, thence upwardly and converging to the front where they are brazed or otherwise permanently attached to the sleeve of the guide bar. The vertical braces 17, the transverse stays 18 and the intersection 19 are likewise made secure. The form of the frame as thus made is approximately oval and is exceptionally strong, light and comely. A seat support 20 is also adjustably attached to the frame. A bar 21 extending between the vertical braces 17 carries a strut 22 which forms a fulcrum for the shifting lever 9. The position of the lever with reference to its action on the clutch disk is governed by a bar 23 having three notches, the central one of which holds the clutch disk out of engagement. The two side notches are designed to hold the lever when the disk is engaged with the high or low speed sprocket wheels.

The operation of my invention and the peculiar advantages secured will be understood and appreciated at sight. The wheelman, having the shifting lever within convenient reach can easily with one hand control the machine according to the character of road on which he may be traveling. If it be soft, sandy or hilly, a single movement of the shifting lever will reduce the speed and increase the power. When on descending ground, he can readily throw the clutch out of engagement with both wheels and retard the speed by the application of the brake without removing his feet from the pedals.

What I claim as new is—

In a bicycle, the double frame of an approximately oval form and consisting of metal tubing clamped at one end to the sleeve of the guide bar and thence extending downwardly and diverging to the rear, thence upwardly and converging to the front where the ends are fixed to the guide bar, and having transverse stays near the guide bar, the intersection 18, toward the rear, and the adjustable seat support 20 combined with and forming supports for the adjustable journal boxes 15, of the driving shaft and the rear wheel boxes 16, substantially as and for the purposes set forth.

In testimony that I claim the foregoing I have hereunto set my hand, this 16th day of November, 1892, in the presence of two witnesses.

HOWARD H. HOPKINS.

Witnesses:
M. L. BUTTERFIELD,
GEO. R. HARPER.